United States Patent [19]

Clark

[11] Patent Number: 5,739,704

[45] Date of Patent: Apr. 14, 1998

[54] LOGIC SELECTION CIRCUIT

[75] Inventor: David R. Clark, La Grange, Ill.

[73] Assignee: Bimba Manufacturing Company, Monee, Ill.

[21] Appl. No.: 681,279

[22] Filed: Jul. 22, 1996

[51] Int. Cl.$^6$ ........................................... H03K 19/0175
[52] U.S. Cl. ............................ 326/62; 326/63; 326/75; 326/89
[58] Field of Search .................. 326/62, 63, 75, 326/76, 77, 78, 89

[56] References Cited

U.S. PATENT DOCUMENTS

| | | | |
|---|---|---|---|
| 4,004,279 | 1/1977 | Nezu | 395/310 |
| 4,115,706 | 9/1978 | Yamaguchi | 326/60 |
| 4,135,103 | 1/1979 | Fulkerson | 326/78 |
| 4,232,267 | 11/1980 | Hanajima et al. | 327/48 |
| 4,339,676 | 7/1982 | Ramsey | 326/56 |
| 4,940,904 | 7/1990 | Lin | 327/256 |
| 5,017,810 | 5/1991 | Nakano et al. | 326/38 |
| 5,214,317 | 5/1993 | Nguyen | 326/77 |
| 5,231,312 | 7/1993 | Gongwer et al. | 326/47 |
| 5,359,241 | 10/1994 | Hasegawa et al. | 326/75 |
| 5,361,005 | 11/1994 | Slattery et al. | 326/56 |
| 5,428,305 | 6/1995 | Wong et al. | 326/75 |
| 5,631,580 | 5/1997 | Rau . | |

Primary Examiner—Tan T. Nguyen
Attorney, Agent, or Firm—Lockwood, Alex, FitzGibbon & Cummings

[57] ABSTRACT

A logic selection circuit for selectively matching the transistor logic type of a first interfacing circuit with the transistor logic type of a second interfacing circuit. The logic selection circuit comprises a circuit latching means which latches the level of voltage signal present at the second interfacing circuit while receiving a signal from the first interfacing circuit. The logic selection circuit further comprises both an NPN transistor and a PNP transistor to ensure that the transistor logic type of the first interfacing circuit and the transistor logic type of the second interfacing circuit may be properly matched. The logic selection circuit disclosed may be utilized in a conventional magnetic proximity sensor which helps to control the movement of a piston within a cylinder.

23 Claims, 3 Drawing Sheets

LOGIC SELECTION CIRCUIT

BACKGROUND OF THE INVENTION

The present invention is generally directed to an improved logic circuit and, more particularly, to a logic selection circuit which automatically matches the transistor logic type for interfacing electronic circuitry without the undesirable necessity of human intervention. In a preferred application, the logic selection circuit automatically matches the transistor logic type between the output terminals of a magnetic proximity sensor and the corresponding input terminals of a programmable logic controller. In this application, the magnetic proximity sensor may, for example, sense the magnetic field resulting from a magnet placed in spatial relationship with the movable piston typically found in a cylinder, for example, a rodless cylinder. The logic selection circuit, which is electrically coupled with the circuitry of the magnetic proximity sensor, ensures that the magnetic proximity sensor and the programmable logic controller are able to properly communicate with each other in an electrical fashion.

Various types of logic circuits have been constructed for establishing an interface between two or more electronic circuits. As is well known in the art, bipolar transistor technology consists of two basic transistor logic types, NPN transistors and PNP transistors. NPN transistors are also known as "sinking" transistors; PNP transistors are also known as "sourcing" transistors.

A communication interface between electronic circuits requires a proper match of their transistor logic type, otherwise the circuits will not communicate properly with each other. Previously, human intervention was necessary to ensure that a proper match of transistor logic type was made between interfacing electronic circuits. In the typical situation, the interface itself would contain transistors of both logic types and would require a technician to manually connect the interfacing circuitry with their matching transistor logic type. Because the scale of electronic systems and networks has continued to grow, the cost of this human intervention has dramatically risen. Furthermore, inadvertent errors made by technicians have lead to costly troubleshooting expenses.

The use of the prior transistor logic type matching circuitry, while providing satisfactory performance in some applications, did not avoid the time, error, and expense resulting from the human intervention described above.

The present invention overcomes this drawback and other disadvantages of the prior transistor logic type matching circuitry by providing a logic selection circuit which automatically selects the matching transistor logic type for interfacing electronic circuitry.

One notable purpose for utilizing the logic selection circuit of the present invention is to establish a properly matched interface between the output terminals of a transducer and the corresponding input terminals of an interfacing data acquisition system. The transducer might comprise practically any element capable of electrically responding to some external stimulus, including, but not limited to, a solenoid, a sensor, a relay, a proximity switch, a push button, or a keyboard. The transducer might additionally comprise the logic selection circuit of the present invention to ensure that a properly matched interface is established between the interfacing terminals of the transducer and the data acquisition system. In an alternative embodiment, the logic selection circuit might be external from the packaging of the transducer circuitry but might nevertheless be connected to the transducer and to the data acquisition system in a manner which permits it to perform its function as an interface.

The data acquisition system of this particular application might comprise most any signal processing device, including, but not limited to, a programmable logic controller, which receives a signal transmitted by the transducer and controls the operation of machinery or other electronic circuitry in response to that received signal, or even a computer terminal, which receives the signal transmitted by the transducer and further processes or stores that signal according to a set of user-defined instructions.

In the following discussion, use of the logic selection circuit of the present invention is described with special reference to a specific context and specific embodiment. This specific context and specific embodiment relate to a system which controls the movement of a movable piston within a cylinder, for example, a rodless cylinder. In particular, the logic selection circuit is included within the circuitry of each magnetic proximity sensor embodied on opposite ends of the cylinder. Each magnetic proximity sensor detects the presence or absence of a nearby magnetic field. In the described context, the magnetic field derives from permanent magnets that are placed in spatial relationship with the piston. When one of these permanent magnets comes within close proximity of the magnetic proximity sensor (i.e., when the piston is within close proximity of that sensor), a predetermined voltage level is present across the sensor's output terminals. On the other hand, when this permanent magnet is not within close proximity of the magnetic proximity sensor (i.e., when the movable piston is not within close proximity of that sensor), a predetermined voltage level of a different magnitude is present across the sensor's output terminals.

When each magnetic proximity sensor detects the presence of the nearby magnetic field resulting from a permanent magnet, that sensor transmits a signal to a programmable logic controller which is electrically coupled with the sensor. The purpose of the logic selection circuit is to ensure that the corresponding input terminals of the programmable logic controller are able to properly identify this signal transmitted by the input terminals of the interfacing magnetic proximity sensor under all circumstances.

In particular, a logic selection circuit, which is found in each of the magnetic proximity sensors, ensures that a properly matched transistor logic type exists between the output terminals of each magnetic proximity sensor and the corresponding output terminals of the interfacing programmable logic controller. To achieve that result, the logic selection circuit will "sink" or "source" the voltage level already present across the corresponding input terminals of the programmable logic controller, depending upon which voltage level, a relatively high voltage level or a relatively low voltage level, the controller is capable of identifying. In the ordinary circumstance, the logic selection circuit will "sink" (i.e., ground out) the voltage level present across the corresponding input terminals of the programmable logic controller when the level of the voltage signal across those terminals was previously at a relatively high voltage level. Conversely, the logic selection circuit will "source" current to the corresponding input terminals of the programmable logic controller when the level of the voltage signal across those terminals was previously at a relatively low voltage level, thereby driving the voltage signal present across those input terminals to a relatively high voltage level. In either case, the voltage level present across the input terminals of the programmable logic controller is inverted from its previous voltage level. Accordingly, the programmable logic controller is capable of identifying the detection of a nearby magnetic field by each of the magnetic proximity sensors.

Although this specification describes the logic selection circuit of the present invention in the above-identified context, the present invention is also well suited for implementation in other end use environments. For instance, the logic selection circuit of the present invention might be utilized in a climate control system. In this application, a temperature sensor would typically monitor the temperature within an enclosed room and transmit an enable signal to a control device when that temperature reaches a predetermined value. The control device might then control an air conditioning or a heating unit in response to the signal received from the temperature sensor. Without the logic selection circuit of the present invention, the input terminals of the control device would not be capable of identifying the signal transmitted from their corresponding output terminals of the temperature sensor, absent the situation where the transistor logic types of the interfacing terminals of these two devices were already properly matched.

The logic selection circuit of the present invention might also be incorporated within a traffic control system. In particular, the logic selection circuit would serve as an interface between the output terminals of a proximity switch, which identifies the passing of an automotive vehicle, and the corresponding input terminals of a control device, which might process a signal transmitted by the proximity switch in response to the passing automotive vehicle. This control device might, for instance, store information about the traffic patterns identified during specific time periods throughout the day. Alternatively, this control device might control the operation of traffic signal devices to help ensure efficient traffic control. Again, without the logic selection circuit of the present invention, the input terminals of this control device would not be capable of identifying the signal transmitted by the corresponding output terminals of the proximity switch, absent the situation where the transistor logic types of the interfacing terminals of these respective devices were already properly matched.

The above-described applications do not, by any means, comprise an exhaustive list of the possible applications for utilizing the logic selection circuit of the present invention. Instead, those applications are listed merely to identify a few of the many applications in which use of the logic selection circuit of the present invention would be desirable.

The present invention provides significant advantages over the prior art. Prior to the present invention, a technician would need to ensure that the transistor logic type of the output terminals of the transducer was properly matched with the transistor logic type of the corresponding input terminals of the data acquisition system, otherwise the transducer and the data acquisition system could not communicate properly with each other and they were essentially useless while in combination. To meet this requirement of a properly matched transistor logic type between the output terminals of the transducer and the corresponding input terminals of the data acquisition system, a technician would have to manually connect both the transducer and the data acquisition system to corresponding transistors which were designed to establish the properly matched interface.

The logic selection circuit of the present invention renders this task no longer necessary. In particular, the logic selection circuit of the present invention includes transistors of both recognized transistor logic types. The logic selection circuit automatically selects the interfacing transistor which is needed to establish a properly matched interface between the interfacing electronic circuitry. In the described application, the logic selection circuit properly matches the interface between the transducer and the data acquisition system, thereby ensuring that the two interfacing circuits may communicate properly with each other.

Accordingly, it is a general object of the present invention to provide a new way to match the transistor logic type for interfacing electronic circuitry.

It is a more specific object of the present invention to provide a logic selection circuit which avoids the expensive and error-prone human intervention previously required for matching the transistor logic type for interfacing electronic circuitry.

It is a still more specific object of the present invention to provide a logic selection circuit which automatically matches the transistor logic type for interfacing electronic circuitry.

It is a still more specific object of the present invention to provide a logic selection circuit which is electrically coupled with both a data acquisition system and a transducer and which automatically matches the transistor logic type between both circuits to ensure that the circuits are able to communicate properly with each other in an electrical fashion.

It is a still more specific object of the present invention to provide a logic selection circuit which is electrically coupled with both a programmable logic controller and a magnetic proximity sensor wherein the sensor is designed to respond to the presence or absence of a permanent magnet placed in spatial relationship with a movable piston of the type typically located in a cylinder.

SUMMARY OF THE INVENTION

A logic selection circuit is provided which selectively matches the transistor logic type of a first interfacing circuit with the transistor logic type of a second interfacing circuit, thereby ensuring that the two interfacing circuits can communicate properly with each other in an electrical fashion. The logic selection circuit is comprised of a control interface line, which is connectable to the first interfacing circuit, a communication interface line, which is connectable to the second interfacing circuit, a circuit matching means, which selectively matches the transistor logic type of the two interfacing circuits, and a circuit latching means, which latches the voltage signal present at the input to the circuit matching means while an enable signal is present on the control interface line.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENTS

Figure 1:
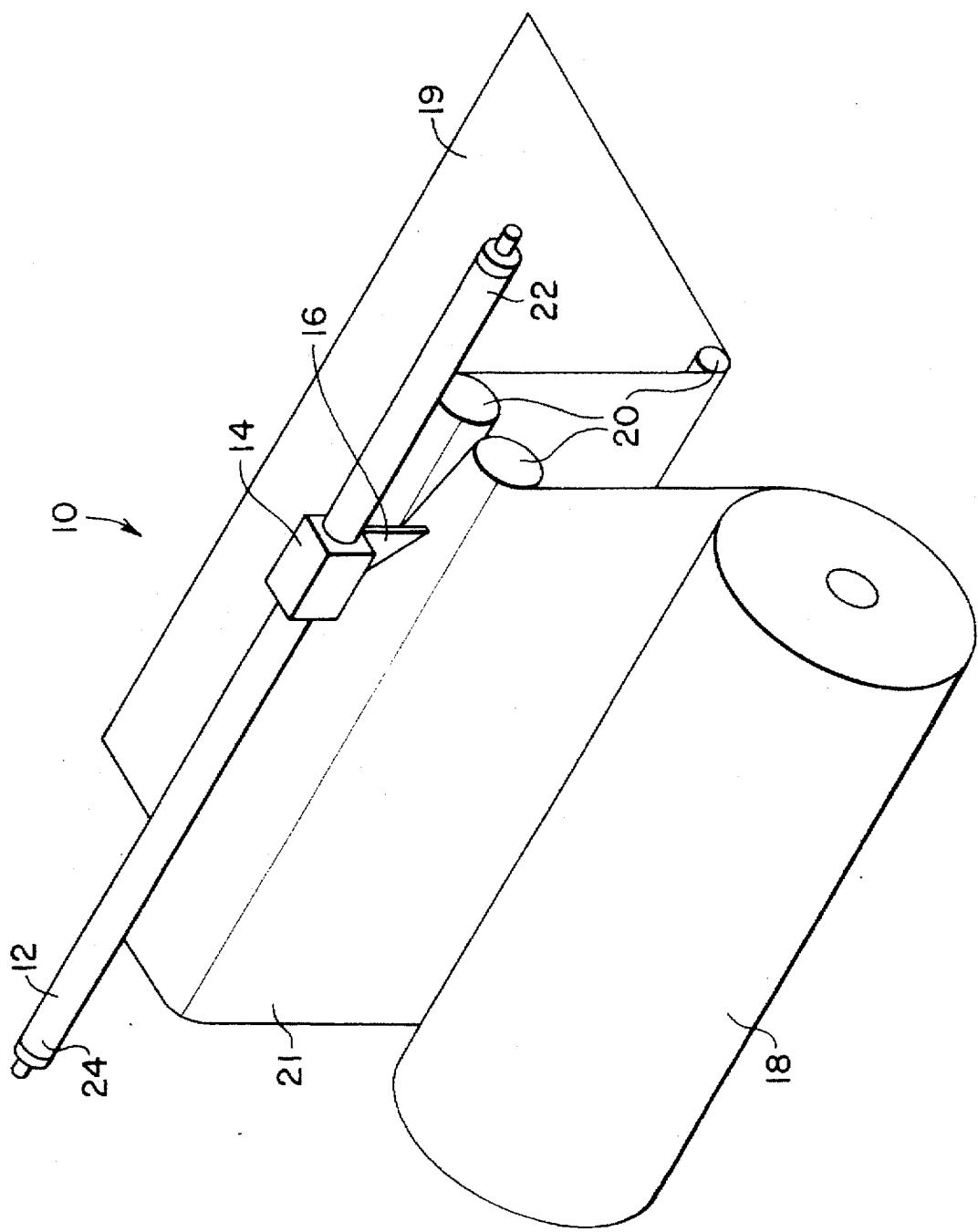
FIG. 1 is a perspective view of a cutting system showing one of the many applications in which the logic selection circuit of the present invention may be used.

Referring to FIG. 1, a cutting system generally designated by reference numeral 10 is shown which includes a rodless cylinder 12, a carriage 14, a cutting element 16, a movable piston 17 (FIG. 2), a roll 18 of material 19, and a series of rollers 20. Although a rodless cylinder is disclosed and illustrated in the Figures, it will be appreciated that a cylinder generally (i.e., a cylinder which is not rodless) may be used in the embodiment described. However, for the sake of consistency, cylinder 12 will be described as a rodless cylinder.

In operation, a web 21 of material 19 is fed through the series of rollers in a manner such as the one shown so that the web of material is placed in close proximity to cutting element 16. Cutting element 16, which is mounted on carriage 14, is used to cut the web of material at a desired location. To cut the material, cutting element 16 is dragged across the web of material in a longitudinal-wise direction by movement of movable piston 17 which is in operative association with the cutting element and which is located within rodless cylinder 12. It will be appreciated that movable piston 17 and cutting element 16 may be operatively associated with each other in any manner well known in the art. In the particular embodiment depicted in FIG. 1, carriage 14 may, for instance, be magnetically coupled with movable piston 17 so that when the piston moves in either axialwise direction within rodless cylinder 12, the cutting element moves in that same direction. The strength of this magnetic coupling determines the load that carriage 14 may carry while in operation. In the described application, carriage 14 begins at a starting end 22 of rodless cylinder 12, moves towards a finishing end 24 of the rodless cylinder while cutting the material, and returns to the starting end upon completion of the desired cut.

Figure 2:
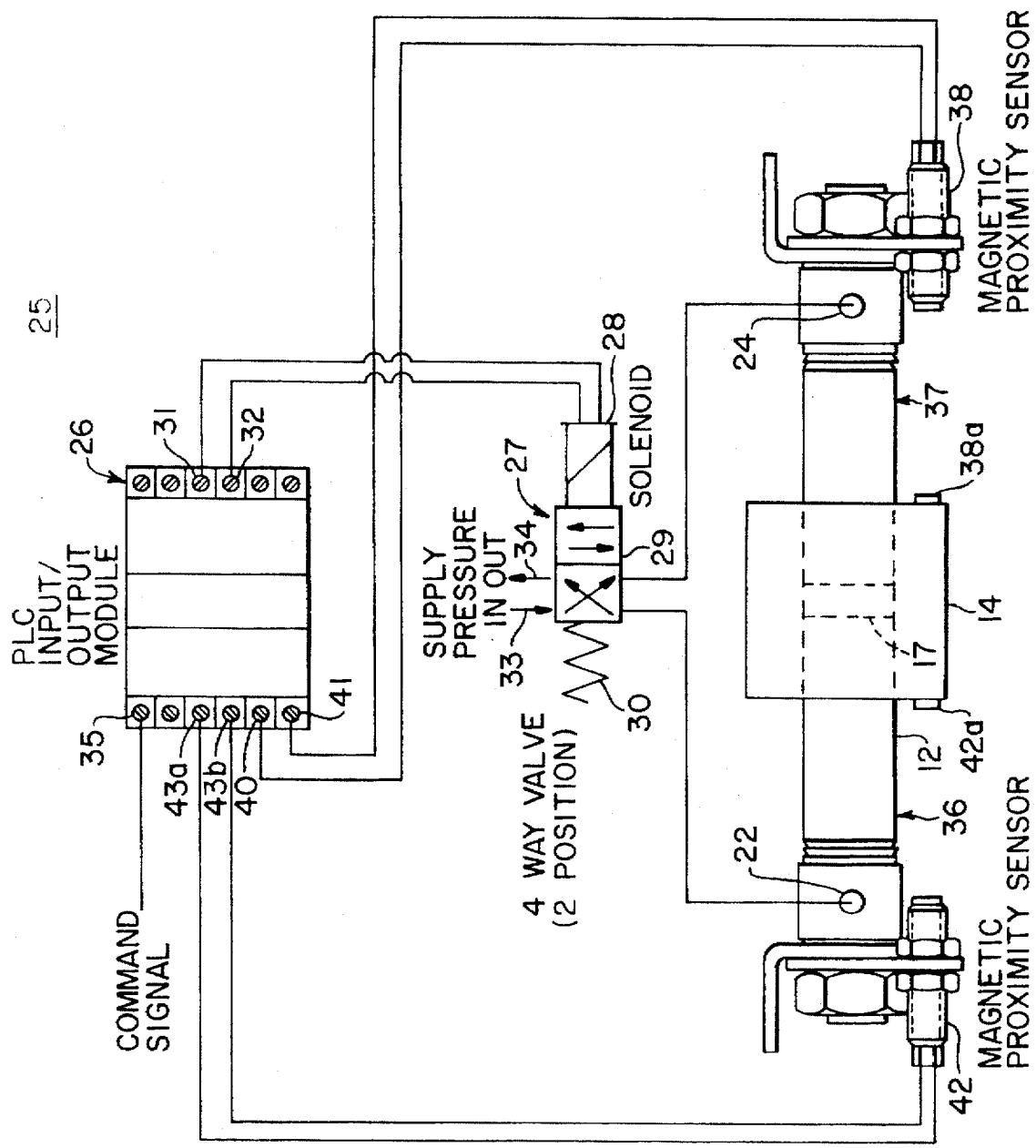
FIG. 2 is a schematic diagram showing the principal components of the electronically-controlled air pressure system which is used to control the operation of the cutting system depicted in FIG. 1.

Referring now to FIG. 2, the movement and return of carriage 14 is typically accomplished by an electronically-controlled air pressure system generally designated by reference numeral 25. A programmable logic controller 26 is in electrical communication with a two-position (four-way) valve 27, which internally comprises a solenoid 28, a two-position member 29 and a spring member 30. The positioning of two-position member 29 is controlled by programmable logic controller 26.

In particular, when programmable logic controller 26 applies a voltage across its output terminals 31 and 32, the solenoid 28 within two-position valve 27 is energized. This energization of solenoid 28 induces a magnetic field which overcomes the natural spring force of spring member 30, causing two-position valve to shift two-position member 29 into the position not shown in FIG. 2 wherein the supply channel 33 of the valve is in communication with starting end 22 of rodless cylinder 12 and wherein the bleed channel 34 of the valve is in communication with finishing end 24 of rodless cylinder 12.

On the other hand, when programmable logic controller 26 does not apply a voltage across its output terminals 31 and 32, the solenoid 28 is de-energized. In this situation, the natural spring force of spring member 30 causes two-position valve 27 to shift two-position member 29 into the position shown in FIG. 2 wherein supply channel 33 is in communication with finishing end 24 of rodless cylinder 12 and wherein bleed channel 34 is in communication with starting end 22 of rodless cylinder 12.

In operation, this shifting two-position member 29 by two-position valve 27 controls the movement and return of carriage 14. Specifically, movable piston 17, and hence carriage 14, initially rest at starting end 22 of rodless cylinder 12. Programmable logic controller 26 awaits a command signal from an external source (not shown), the signal commanding the air pressure system 25 to move carriage 14 from starting end 22 to finishing end 24. Upon receipt of this command signal at input terminal 35 of programmable logic controller 26, the controller applies a voltage across its output terminals 31 and 32, which, as described above, causes supply channel 33 and bleed channel 34 to be in communication with starting end 22 and finishing end 24, respectively. Consequently, the air pressure within a cylindrical volume generally designated as reference numeral 36 begins to increase and the air pressure within a cylindrical volume generally designated as reference numeral 37 begins to decrease. As defined, cylindrical volume 36 is the volume within rodless cylinder 12 which is bounded by starting end 22 and movable piston 17. Furthermore, as defined, cylindrical volume 37 is the volume within rodless cylinder 12 which is bounded by finishing end 24 and movable piston 17.

Once the air pressure within cylindrical volume 36 surpasses the air pressure within cylindrical volume 37, a differential force is exerted on movable piston 17, causing the piston to move towards finishing end 24 of rodless cylinder 12. Since carriage 14 is magnetically coupled with movable piston 17, the carriage moves in that same direction. Furthermore, cutting element 16 (see FIG. 1), which is mounted on carriage 14, moves in that direction. Accordingly, cutting system 10 is able to cut web 21 of material 19 at the desired location (see FIG. 1).

In the described embodiment, carriage 14 will continue to move towards finishing end 24 of rodless cylinder 12 until a magnetic proximity sensor 38, located in close proximity with finishing end 24, detects the presence of a magnetic field resulting from a first permanent magnet 38a which is mounted on one end of carriage 14. Once magnetic proximity sensor 38 detects the presence of this magnetic field, the sensor, which includes the logic selection circuit of the present invention within its circuitry, will toggle the level of the voltage signal present across input terminals 40 and 41 of programmable logic controller 26. In particular, the sensor will toggle the level of that signal from a relatively high voltage level to a relatively low voltage level, or vice versa, depending upon the existing transistor logic type across input terminals 40 and 41.

When the voltage level present across input terminals 40 and 41 of programmable logic controller 26 is toggled by magnetic proximity sensor 38, the controller removes the voltage previously applied across its output terminals 31 and 32. This de-energizes solenoid 28, which, as described above, causes supply channel 33 and bleed channel 34 to be in communication with finishing end 24 and starting end 22, respectively. Consequently, the air pressure within cylindrical volume 36 begins to decrease and the air pressure within cylindrical volume 37 begins to increase.

Once the air pressure within cylindrical volume 37 surpasses the air pressure within cylindrical volume 36, a differential force is exerted on movable piston 17, causing the piston to return towards starting end 22 of rodless cylinder 12. Since carriage 14 is magnetically coupled with movable piston 17, the carriage moves in that same direction. The carriage continues to return towards starting end 22 of rodless cylinder 12 until a magnetic proximity sensor 42, which may be similar in design and operation as magnetic proximity sensor 38, detects the presence of a nearby magnetic field resulting from a second permanent magnet 42a which is mounted on the end of carriage 14 opposite of first permanent magnet 38a. Upon its detection of that magnetic field, magnetic proximity sensor 42, which also includes the logic selection circuit of the present invention within its circuitry, transmits a signal to input terminals 43a and 43b of programmable logic controller 26, indicating that the air pressure system 26 is ready to receive a subsequent command signal from the external source (not shown). Again, sensor 42 toggles the level of the voltage signal present across terminals 43a and 43b from a relatively high voltage level to a relatively low voltage level, or vice versa, depending upon the existing transistor logic type across those terminals.

The present invention is directed to circuitry, namely a logic selection circuit, which is electrically coupled with the circuitry of magnetic proximity sensor 38. Furthermore, a second logic selection circuit, identical in design and operation as the first logic selection circuit, may be electrically coupled with the circuitry of magnetic proximity sensor 42. The purpose of these logic selection circuits is to match the transistor logic type between the output terminals of magnetic proximity sensors 38 and 42 and their corresponding input terminals 40 and 41 or 43a and 43b, respectively, of programmable logic controller 26. Although the circuitry of the present invention is described for use within each of the magnetic proximity sensors utilized to control the carriage of the cutting system in FIGS. 1 and 2, it will be appreciated that the circuitry may be utilized in a wide variety of applications. For example, the cylinder depicted in FIGS. 1 and 2 may be used for transferring materials between different locations in a work environment, feeding materials into machines, opening doors, and even silk screening. In a broad sense, the circuit of the present invention is designed to produce beneficial results for any interface of two or more electronic circuits. Therefore, the circuitry of the present invention is generally identified as a logic selection circuit.

Figure 3:
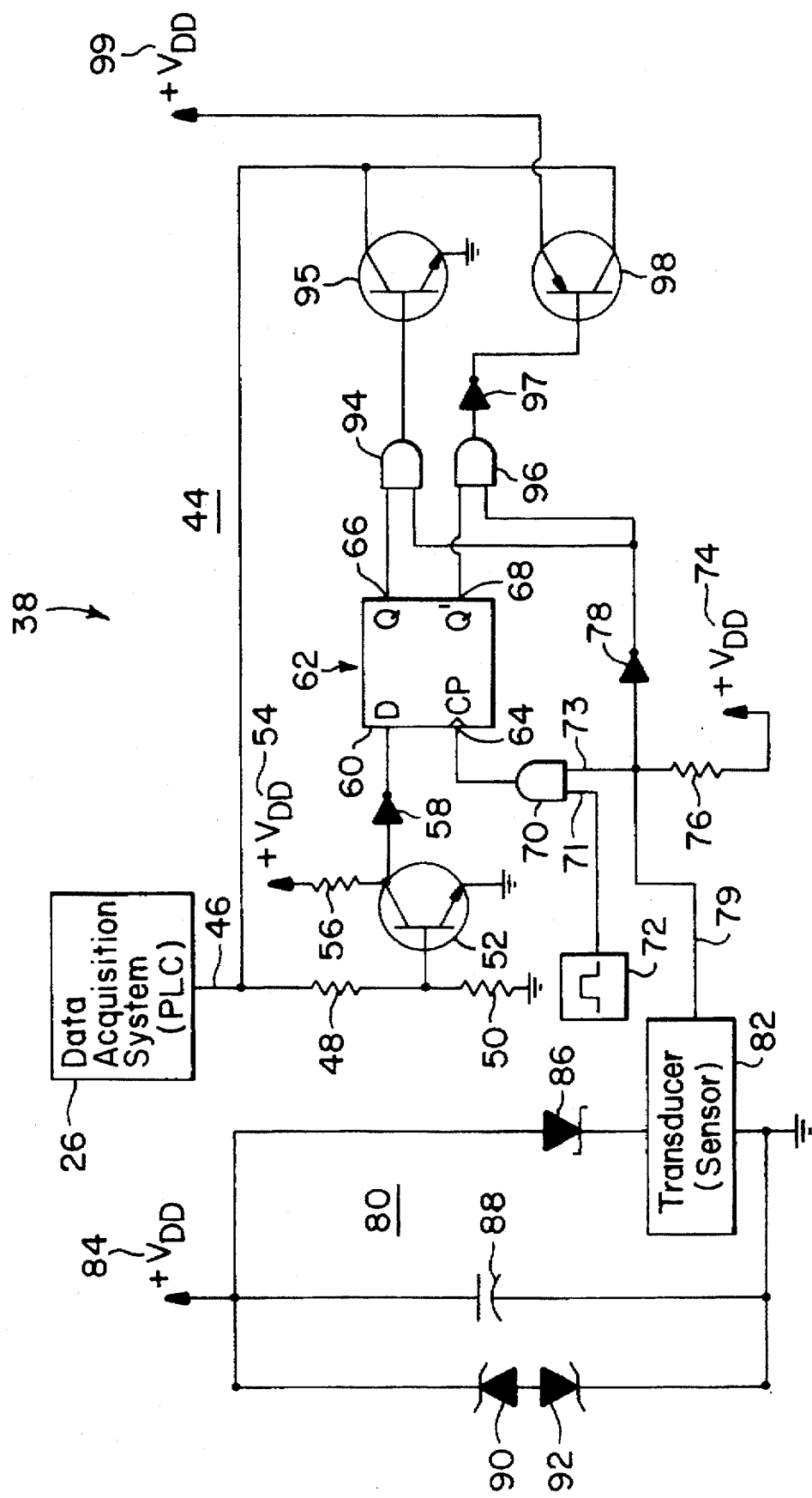
FIG. 3 is an electrical schematic diagram of the electrical connection between one of the magnetic proximity sensors and the programmable logic controller of the electronically-controlled air pressure system depicted in FIG. 2 including the logic selection circuit constructed in accordance with the present invention.

As shown in a preferred embodiment depicted in FIG. 3, magnetic proximity sensor 38 (FIG. 2) includes a logic selection circuit generally designated by reference numeral 44. It will be appreciated, however, that logic selection circuit 44 may be electrically coupled with magnetic proximity sensor 38 in any manner well known in the art. Furthermore, magnetic proximity sensor 42 (FIG. 2) includes a logic selection circuit identical in design and operation to the logic selection circuit 44 depicted in FIG. 3. Again, it will be appreciated that this logic selection circuit may be electrically coupled with magnetic proximity sensor 42 in any manner well known in the art. For the purpose of simplicity, the logic selection circuit within the circuitry of magnetic proximity sensor 44 will not be discussed herein. Nevertheless, it will be appreciated that the logic selection circuit within the circuitry of magnetic proximity sensor 42 operates in an analogous manner to logic selection circuit 44 which is described below with reference to FIG. 3.

As shown in FIG. 3, the circuitry of magnetic proximity sensor 38, which includes logic selection circuit 44, is electrically coupled to a data acquisition system shown in this specific context as programmable logic controller 26. Logic selection circuit 44 comprises a communication interface 46 which can accommodate full duplex digital communication between the logic selection circuit and programmable logic controller 26. Communication interface 46 connects to a first terminal of resistor 48, which serves as the upper half of a voltage divider while in combination with resistor 50. The values of resistors 48 and 50 should be sufficiently high enough to keep any undesirable leakage current from programmable logic controller 26 to a bare minimum. A second terminal of resistor 48 is connected to a first terminal of resistor 50 and to the base electrode of an input device, which is shown in this embodiment as an NPN transistor 52. The first terminal of resistor 50 is likewise connected to the base electrode of NPN transistor 52. However, a second terminal of that resistor is connected directly to ground, which completes the voltage divider network. Acting together, resistors 48 and 50 apply a voltage signal to the base electrode of NPN transistor 52. This voltage signal has a voltage level comprising a predetermined fraction of the voltage level present at communication interface 46 (i.e., at the input terminals of programmable logic controller 26).

In accordance with a conventional sinking or common emitter configuration, the collector electrode of NPN transistor 52 is connected to a power supply 54 through pull-up resistor 56 and the emitter electrode of that device is connected directly to ground. When a voltage signal of relatively high level is present at communication interface 46 (i.e., at the input terminals of programmable logic controller 26), the voltage divider network comprising resistors 48 and 50 applies a voltage signal of generally high level to the base electrode of NPN transistor 52. In response, NPN transistor 52 assumes a conductive state and its collector electrode voltage sinks to ground (hereinafter identified as a LOW voltage level). On the other hand, when a voltage signal of relatively low level is present at communication interface 46 (i.e., at the input terminals of programmable logic controller 26), the voltage divider network applies a voltage signal of generally low level to the base electrode of NPN transistor 52. In response, NPN transistor 52 assumes a non-conductive state and its collector electrode assumes a voltage level which approximates the voltage magnitude of power supply 54 (hereinafter identified as a HIGH voltage level). Accordingly, the collector electrode voltage of NPN transistor 52 can assume two generally different voltage levels, designated as HIGH and LOW, which allows the NPN transistor to serve as the input device for logic selection circuit 44.

The collector electrode of NPN transistor 52 is further connected to the input terminal of a NOT gate 58, which may be conventional in design and operation. The output terminal of NOT gate 58 assumes a voltage level which is the logical inverse of the level of the voltage signal present at the collector electrode of NPN transistor 52. This inverted voltage signal is then applied to a data input line 60 of a data latch generally designated by reference numeral 62, which may be conventional in design and operation. Therefore, if the voltage signal present at the collector electrode of NPN transistor 52 is at a HIGH level, NOT gate 58 applies a voltage signal of LOW level to the data input line of data latch 62. Moreover, if the voltage signal present at the collector electrode of NPN transistor 52 is at a LOW level, the NOT gate applies a voltage signal of HIGH level to the data input line of data latch 62. It will be appreciated that the data input line of data latch 62 assumes a HIGH voltage level when the voltage level of the signal present at communication interface 46 (i.e., at the input terminals of programmable logic controller 26) is relatively high. In similar fashion, the data input line of data latch 62 assumes a LOW voltage level when the voltage level of the signal present at communication interface 46 (i.e., at the input terminals of programmable logic controller 26) is relatively low. Accordingly, the voltage level present at data input line 60 of data latch 62 follows the voltage level of the signal present at communication interface 46 (i.e., at the input terminals of programmable logic controller 26).

In addition to data input line 60, data latch 62 includes a clock line 64, an output line 66, and an inverted output line 68. Data latch 62 will enter its conventional sample mode only when the voltage signal present at clock line 64 makes a triggering transition of voltage level, which is a LOW-to-HIGH transition for a positive-edge-triggered data latch and is a HIGH-to-LOW transition for a negative-edge-triggered data latch. When a triggering transition occurs, data latch 62 detects the transition and enters its sample mode, in which the data latch transmits the voltage level of the signal present at data input line 60 to output line 66. Furthermore, data latch 62 inverts the voltage level of the signal present at its data input line and transmits this inverted signal to its inverted output line 68 at that time.

On the other hand, when clock line 64 of data latch 62 is not making a transition that triggers its sample mode, the latch remains in its conventional latch mode, in which it locks the voltage signals present at its output and its inverted output lines. Moreover, the latch no longer samples the voltage signal present at its data input line while it is in its latch mode.

Clock line 64 of data latch 62 receives its voltage signal from the output terminal of AND gate 70. A first input terminal 71 of AND gate 70 is connected to a clock pulse generator 72, which typically generates a train of alternating HIGH and LOW voltage pulses in a manner well known in the art. It will be appreciated that clock 72 may include a delay mechanism of the type well known in the art to satisfy any circuit timing requirement of the present invention. A second input terminal 73 of AND gate 70 is connected to a power supply 74 through pull-up resistor 76, to the input terminal of a NOT gate 78, and to a control interface 79 which connects logic selection circuit 44 with communication enable circuitry 80. The communication enable circuitry is shown in FIG. 3 as a conventionally-designed magnetic proximity switch. In particular, communication enable circuitry includes several circuit components comprising a solid-state sensor 82, a power supply 84, a shottky diode 86, a capacitor 88, and two opposing zener diodes 90 and 92. Solid-state sensor 82 has three terminals. A first terminal receives the sensor's required operating power from power supply 84 to which it is connected through shottky diode 86. A second terminal is tied directly to ground and a third terminal is connected to logic selection circuit 44 by control interface 79, which allows the sensor to transmit an enable signal to the logic selection circuit upon sensation of an external stimulus, which, in the described application, is the nearby magnetic field resulting from the close proximity of permanent magnet 38a when movable piston 17 is at finishing end 24 of rodless cylinder 12 (see FIG. 2).

Shottky diode 86, capacitor 88, and opposing zener diodes 90 and 92 all serve as protection for solid-state sensor 82. In particular, shottky diode 86 prevents reverse polarity from being placed across the terminals of the sensor, capacitor 88, which is tied in parallel to the combination of the shottky diode and the sensor, decouples the sensor from any ac voltage that might be inadvertently drawn from power supply 84, and opposing zener diodes 90 and 92, which are also tied in parallel to the combination of the shottky diode and the sensor, limit the maximum voltage applied across the sensor.

Communication enable circuitry 80 serves as the control mechanism for logic selection circuit 44. In particular, when communication enable circuitry 80 does not send an enable signal to logic selection circuit 44 (i.e., when movable piston 17 is far enough away from finishing end 24 of rodless cylinder 12 so that solid-state sensor 82 does not detect the presence of a nearby magnetic field resulting from permanent magnet 38a (see FIG. 2)), the second input terminal 73 of AND gate 70 assumes a HIGH voltage level, which approximates the voltage magnitude of power supply 74, and the gate's output terminal will therefore follow the voltage level of the alternating pulse train generated by clock 72. Under those circumstances, clock line 64 of data latch 62 is driven by clock 72. As a result, data latch 62 periodically enters its sample mode coincident with each alternate transition of the clock and samples the voltage signal present at data input line 60 which, as described above, follows the voltage signal present across the input terminals of programmable logic controller 26.

In the alternative situation wherein communication enable circuitry 80 sends an enable signal to logic selection circuit 44 (i.e., when movable piston 17 is close enough to finishing end 24 of rodless cylinder 12 so that solid-state sensor 82 detects the presence of a nearby magnetic field resulting from permanent magnet 38a (see FIG. 2)), the second input terminal 73 of AND gate 70 assumes a LOW voltage level. In response, the output terminal of AND gate 70 and, likewise, clock line 64 of data latch 62 both assume LOW voltage levels. Because no triggering transition of clock line 64 will occur under those circumstances, data latch 62 will remain in its latch mode and will no longer sample data input line 60. Instead, the latch will retain the respective voltage signals present on its output and inverted output lines 66 and 68 until communication enable circuitry 80 once again fails to send an enable signal to logic selection circuit 44 (i.e., when movable piston 17 moves far enough away from finishing end 24 of rodless cylinder 12 so that solid-state sensor 82 no longer detects the presence a nearby magnetic field resulting from permanent magnet 38a (see FIG. 2)), thereby causing the latch to periodically reenter its sample mode.

While latch 62 periodically enters its sample mode, the input to NOT gate 78 assumes a HIGH voltage level which approximates that of power supply 74. In response, the output terminal of NOT gate 78, which is connected to one input terminal of AND gate 94, assumes a LOW voltage level. Therefore, the output terminal of AND gate 94 will also assume a LOW voltage level, regardless of the level of the voltage signal present at the gate's other input terminal. This LOW voltage level assumed by the output terminal of AND gate 94 is applied to the base electrode of an NPN transistor 95 to render that device non-conductive.

In addition to AND gate 94, NOT gate 78 is connected to one input terminal of AND gate 96. As described above, while latch 62 periodically enters its sample mode, a signal of LOW voltage level is present at the output terminal of NOT gate 78 and, likewise, at one input terminal of AND gate 96. In response, the output terminal of AND gate 96 is driven to a LOW voltage level, regardless of the level of the voltage signal present at its other input terminal. The output terminal of that AND gate is connected to the input terminal of a NOT gate 97. Here, the output terminal of NOT gate 97 assumes a HIGH voltage level which is applied to the base electrode of a PNP transistor 98 to render that device non-conductive.

Accordingly, when communication enable circuitry 80 does not send an enable signal to logic selection circuit 44

(i.e., when movable piston 17 is far enough away from finishing end 24 of rodless cylinder 12 so that solid-state sensor 82 does not detect the presence of a nearby magnetic field resulting from permanent magnet 38a (see FIG. 2)), data latch 62 periodically enters its sample mode. Moreover, NPN transistor 95 and PNP transistor 98 are both rendered non-conductive.

In the alternative situation wherein data latch 62 remains in its latch mode, the input terminal to NOT gate 78 assumes a LOW voltage level, which is inverted to a HIGH voltage level by the gate and then applied to one input terminal of AND gate 94. The other input terminal of AND gate 94 is connected to output line 66 of data latch 62. Thus, the output terminal of AND gate 94 will follow the voltage level of the signal present at output line 66 under these circumstances and will apply a signal of that voltage level to the base electrode of NPN transistor 95. In similar fashion, the output terminal of NOT gate 78 is also connected to one input terminal of AND gate 96. The other input terminal of AND gate 96 is connected to inverted output line 68 of data latch 62. Therefore, the output terminal of AND gate 96 will follow the voltage level of the signal present at inverted output line 68 under these circumstances and will apply a signal of that voltage level to the input terminal of NOT gate 97, which inverts the voltage level of that signal and transmits the inverted signal to the base electrode of PNP transistor 98. It will be appreciated that the level of the voltage signal present at the base electrode of PNP transistor 98 is equivalent to the level of the voltage signal present at the base electrode of NPN transistor 95 while data latch 62 remains in its latch mode. In particular, the base electrodes of both transistors are set to a HIGH voltage level if a signal having a relatively high voltage level was present at communication interface 46 (i.e., across the input terminals of programmable logic controller 26) when the final sample of data input line 60 was taken before communication enable circuitry 80 transmitted an enable signal to logic selection circuit 44 (i.e., just prior to when movable piston 17 is positioned close enough to finishing end 24 of rodless cylinder 12 so that solid-state sensor 82 detects a nearby magnetic field resulting from permanent magnet 38a (see FIG. 2)). Likewise, the base electrodes of both transistors are set to a LOW voltage level if a signal having a relatively low voltage level was present at the communication interface (i.e., across the input terminals of programmable logic controller 26) when the final sample of data input line 60 was taken (i.e., just prior to when movable piston 17 is positioned close enough to finishing end 24 of rodless cylinder 12 so that solid-state sensor 82 detects a nearby magnetic field resulting from permanent magnet 38a (see FIG. 2)).

In accordance with a conventional sinking configuration, the emitter electrode of NPN transistor 95 is tied to ground and its collector electrode is tied to communication interface 46 (i.e., across the input terminals of programmable logic controller 26). Therefore, if a signal having a relatively high voltage level is present at the communication interface (i.e., across the input terminals of programmable logic controller 26) when data latch 62 exits its sample mode and enters its latch mode (i.e., when communication enable circuitry 80 sends an enable signal to logic selection circuit 44 solid-state sensor 82 detects a nearby magnetic field resulting from permanent magnet 38a (see FIG. 2)), the base and collector electrodes of NPN transistor 95 initially assume a corresponding HIGH voltage level, which renders that device conductive. NPN transistor 95 then sinks the level of the voltage signal present at the communication interface (i.e., across the input terminals of programmable logic controller 26) to ground or a LOW level while data latch 62 prevents the voltage signal present at the communication interface (i.e., across the input terminals of programmable logic controller 26) from reassuming a HIGH voltage level. On the other hand, if a signal having a relatively low voltage level is present at the communication interface (i.e., across the input terminals of programmable logic controller 26) when data latch 62 exits its sample mode and enters its latch mode, NPN transistor 95 is rendered non-conductive because of the corresponding signal of LOW voltage level that is applied to its base electrode throughout the latch mode time period. Under these circumstances, NPN transistor 95 has no effect on the level of the voltage signal present at the communication interface (i.e., across the input terminals of programmable logic controller 26).

In accordance with a conventional sourcing configuration, the emitter electrode of PNP transistor 98 is tied directly to a power supply 99 and its collector electrode is tied to communication interface 46 (i.e., across the input terminals of programmable logic controller 26). Therefore, if a signal having a relatively high voltage level is present at the communication interface (i.e., across the input terminals of programmable logic controller 26) when data latch 62 exits its sample mode and enters its latch mode (i.e., upon movement of movable piston 17 to a position sufficiently close enough to finishing end 24 of rodless cylinder 12 so that solid-state sensor 82 detects the presence of a nearby magnetic field resulting from permanent magnet 38a (see FIG. 2)), the base electrode of PNP transistor 98 assumes a corresponding HIGH voltage level throughout the latch mode time period. This renders PNP transistor 98 non-conductive and therefore that device has no effect on the level of the voltage signal present at the communication interface (i.e., across the input terminals of programmable logic controller 26). However, if a signal of relatively low voltage level is present at communication interface 46 (i.e., across the input terminals of programmable logic controller 26) when data latch 62 exits its sample mode and enters its latch mode (i.e., upon movement of movable piston 17 to a position sufficiently close enough to finishing end 24 of rodless cylinder 12 so that solid-state sensor 82 detects the presence of a nearby magnetic field resulting from permanent magnet 38a (see FIG. 2)), PNP transistor 98 is rendered conductive because of the corresponding signals of LOW voltage level that are initially applied to its base and collector electrodes. This conductivity of PNP transistor 98 allows power supply 99 to source current to communication interface 46, which causes the communication interface to assume a HIGH voltage level approximating the voltage magnitude of power supply 99. As a result, the input terminals of programmable logic controller also assume this same HIGH voltage level which approximates the voltage magnitude of power supply 99. Data latch 62 prevents the communication interface (i.e., the input terminals of programmable logic controller 26) from reassuming a LOW voltage level under these circumstances.

Accordingly, if a signal having a relatively high voltage level is present at communication interface 46 (i.e., across the input terminals of programmable logic controller 26) when data latch 62 exits its sample mode and enters its latch mode (i.e., upon movement of movable piston 17 to a position sufficiently close enough to finishing end 24 of rodless cylinder 12 so that solid-state sensor 82 detects the presence of a nearby magnetic field resulting from permanent magnet 38a (see FIG. 2)), NPN transistor 95 sinks the level of the voltage signal present at the communication interface (i.e., across the input terminals of programmable logic controller 26) to ground until the latch reenters its sample mode (i.e., when movable piston 17 moves sufficiently far enough away from finishing end 24 of rodless cylinder 12 so that solid-state sensor no longer detects the presence of a nearby magnetic field resulting from permanent magnet 38a (see FIG. 2)). On the other hand, if a signal having a relatively low voltage level is present at communication interface 46 (i.e., across the input terminals of programmable logic controller 26) when data latch 62 exits its sample mode and enters its latch mode (i.e., when movable piston 17 moves sufficiently close enough to finishing end 24 of rodless cylinder 12 so that solid-state sensor detects the presence of a nearby magnetic field resulting from permanent magnet 38a (see FIG. 2)), PNP transistor 98 allows power supply 99 to source current to the communication interface, thereby driving the voltage signal present at the communication interface (i.e., across the input terminals to programmable logic controller 26) to a HIGH level which approximates the voltage magnitude of the power supply. Once data latch 62 reenters its sample mode (i.e., when movable piston 17 moves far enough away from finishing end 24 of rodless cylinder 12 so that solid-state sensor can no longer detect the presence of a magnetic field resulting from permanent magnet 38a (see FIG. 2)), NPN transistor 95 and PNP transistor 98 both assume a non-conductive state, thereby permitting communication interface 46 (i.e., the input terminals of programmable logic controller 26) to reassume its normal operating voltage level.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A logic selection circuit for selectively matching a first transistor logic type of a first interfacing circuit with a second transistor logic type of a second interfacing circuit, thereby allowing said first interfacing circuit and said second interfacing circuit to properly communicate with each other in an electrical fashion, said logic selection circuit comprising:

a control interface line connectable to said first interfacing circuit;

a communication interface line connectable to said second interfacing circuit;

circuit matching means for selectively matching said first transistor logic type of said first interfacing circuit with said second transistor logic type of said second interfacing circuit; and circuit latching means for latching a voltage level of a voltage signal present at an input of said circuit matching means when an enable signal is present on said control interface line.

2. The logic selection circuit as defined in claim 1 wherein said circuit latching means further latches a voltage signal present on said communication interface within a predetermined time period after said enable signal is initially present on said control interface line.

3. The logic selection circuit as defined in claim 1 wherein said control interface line is connectable to a transducer circuit.

4. The logic selection circuit as defined in claim 3 wherein said transducer circuit detects an external stimulus.

5. The logic selection circuit as defined in claim 3 wherein said transducer circuit comprises a magnetic proximity sensor.

6. The logic selection circuit as defined in claim 5 wherein said magnetic proximity sensor comprises a solid-state sensor.

7. The logic selection circuit as defined in claim 5 wherein said magnetic proximity sensor detects a nearby magnetic field.

8. The logic selection circuit as defined in claim 7 wherein said nearby magnetic field results from a magnet.

9. The logic selection circuit as defined in claim 8 wherein said magnet is placed in spatial relationship with a movable piston of a cylinder.

10. The logic selection circuit as defined in claim 9 wherein said cylinder is a rodless cylinder.

11. The logic selection circuit as defined in claim 3 wherein said transducer circuit comprises a relay.

12. The logic selection circuit as defined in claim 3 wherein said transducer circuit comprises a solenoid.

13. The logic selection circuit as defined in claim 3 wherein said transducer circuit comprises a sensor.

14. The logic selection circuit as defined in claim 3 wherein said transducer circuit comprises a proximity switch.

15. The logic selection circuit as defined in claim 3 wherein said transducer circuit comprises a push button.

16. The logic selection circuit as defined in claim 3 wherein said transducer circuit comprises a keyboard.

17. The logic selection circuit as defined in claim 1 wherein said communication interface line is connectable to a data acquisition system.

18. The logic selection circuit as defined in claim 17 wherein said data acquisition system comprises a programmable logic controller.

19. The logic selection circuit as defined in claim 17 wherein said data acquisition system comprises a computer.

20. The logic selection circuit as defined in claim 17 wherein said control interface line is connectable to a transducer circuit.

21. The logic selection circuit as defined in claim 18 wherein said control interface line is connectable to a transducer circuit.

22. The logic selection circuit as defined in claim 19 wherein said control interface line is connectable to a transducer circuit.

23. A method for selectively matching a first transistor logic type of a first interfacing circuit with a second transistor logic type of a second interfacing circuit, said method comprising the steps of:

sensing a level of a voltage signal present at said second interfacing circuit;

detecting an enable signal transmitted by said first interfacing circuit;

inverting said level of said voltage signal present at said second interfacing circuit upon an initial detection of said enable signal transmitted by said first interfacing circuit to produce an inverted level of said voltage signal present at said second interfacing circuit; and latching said inverted level of said voltage signal present at said second interfacing circuit while detecting said enable signal transmitted by said first interfacing circuit.

* * * * *